United States Patent [19]

Dreyer

[11] 4,065,412
[45] Dec. 27, 1977

[54] PEPTIDE OR PROTEIN SEQUENCING METHOD AND APPARATUS

[75] Inventor: William J. Dreyer, Altadena, Calif.

[73] Assignee: Durrum Instrument Corporation, Sunnyvale, Calif.

[21] Appl. No.: 684,178

[22] Filed: May 7, 1976

[51] Int. Cl.² ............................................. C08L 37/00
[52] U.S. Cl. .................................. 260/8; 23/253 R; 260/112.5 R
[58] Field of Search .............. 23/253 R; 260/112.5 R, 260/8

[56] References Cited
U.S. PATENT DOCUMENTS 3,725,010  4/1973  Penhast ........................... 23/253 R

OTHER PUBLICATIONS

Edman, P., Acta Chem. Scand. 4, 283-293, 1950.
Biochem. et Biophys. Acta 115, 371-396, 1966.
Methods in Enzymology 11, 455, 461-469, 1967.
Proc. First Int'l. Conf. on Meth. in Protein Sequence Anal., 193 (1975).
Eur. J. Biochem. 1, 80 (1967).
Physiol. Chem. 354, 1415 (1973).
Eur. J. Biochem. 20, 89 (1971).
Febs. Lett. 35, 97 (1973).

Primary Examiner—Delbert R. Phillips
Attorney, Agent, or Firm—Flehr, Hohbach, Test, Albritton & Herbert

[57] ABSTRACT

A method and apparatus for the sequential degradation of protein or peptide molecules by successive coupling and cleavage reactions. Such molecules are immobilized on a macroporous reaction support surface and placed in a flowthrough reaction chamber which is mounted in a sequencer. In the Edman sequencing technique, reagents driven by pressurized inert gas are passed through the reaction chamber as follows: (a) liquid or vapor coupling reagent, (b) coupling base vapor, (c) washing solvent, (d) inert gas to partially dry the support surface, (e) cleavage reagent vapor to cleave amino acid derivatives from the immobilized coupled protein or peptide chains, (f) liquid extracting solvent to withdraw the cleaved amino acid derivative. An automated sequencer to carry out said method.

29 Claims, 2 Drawing Figures

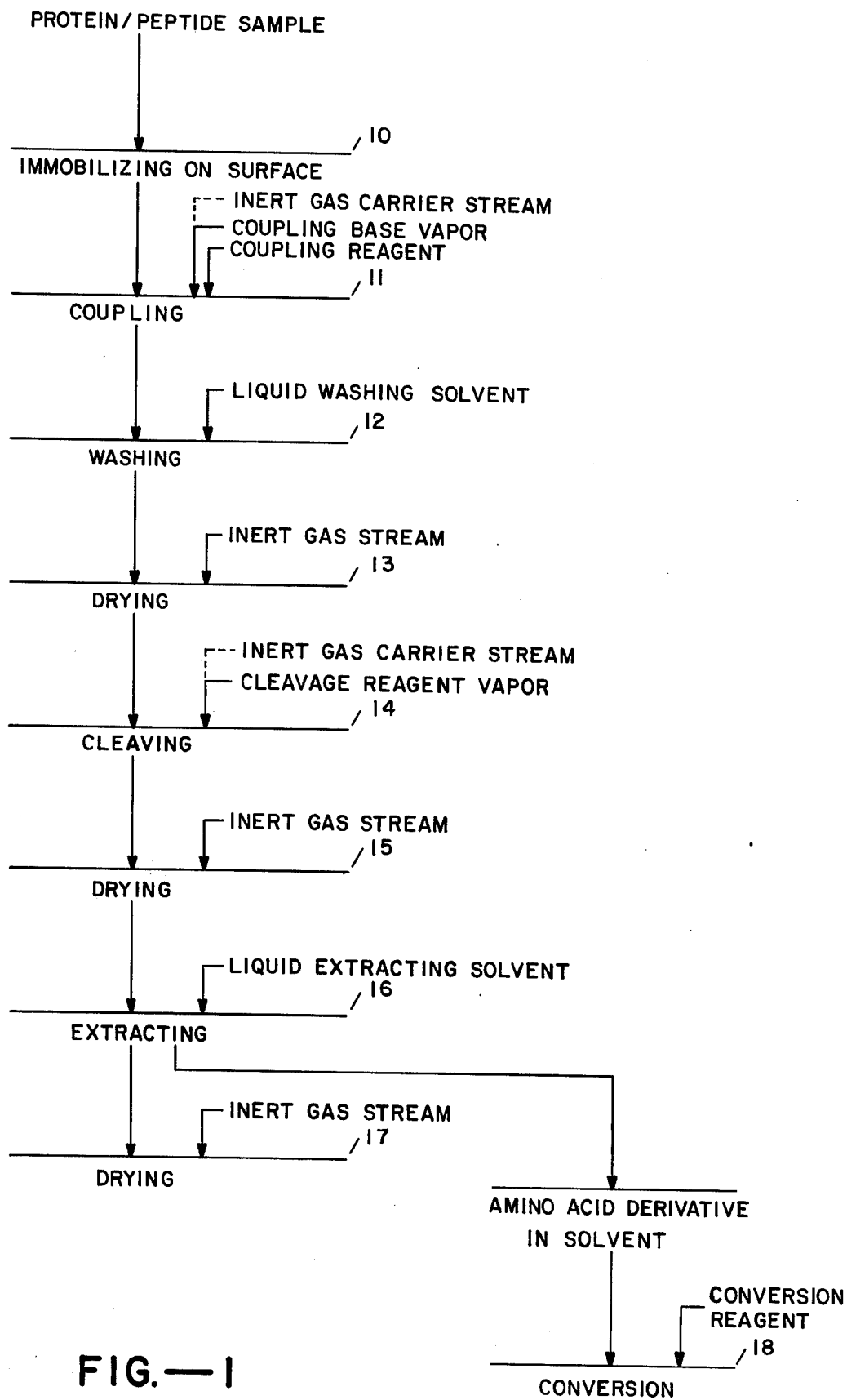
FIG.—1

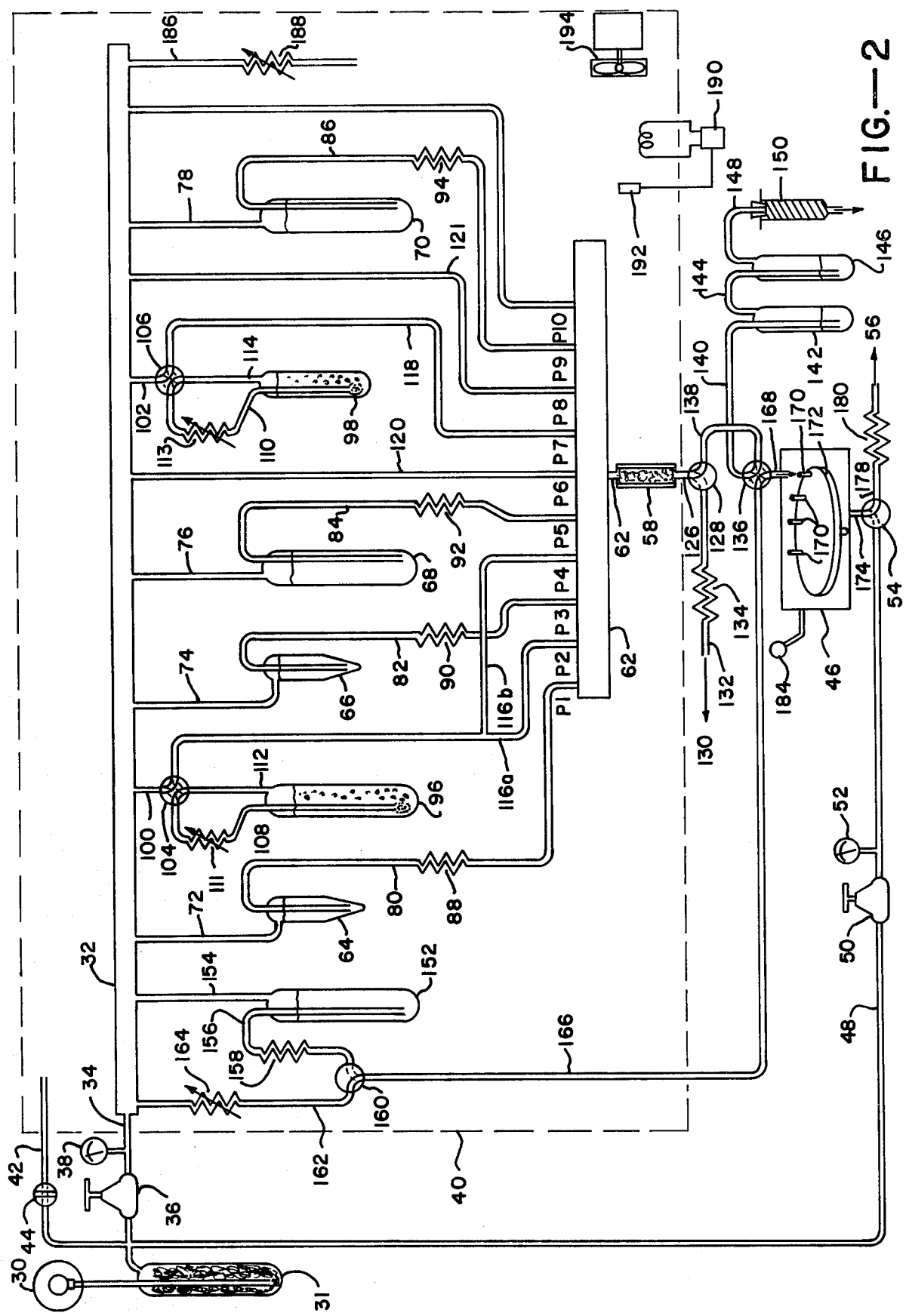
FIG.—2

PEPTIDE OR PROTEIN SEQUENCING METHOD AND APPARATUS

BACKGROUND OF THE INVENTION

The present invention relates to a method and apparatus for the sequential degradation of protein or amino acid chains, specifically by the Edman technique.

At the present time, the sequencing of peptides and proteins is most commonly performed by a series of chemical reactions which, in one cycle of the sequencing process, is referred to as the Edman degradation. Briefly summarized, a typical Edman degradation includes the steps of coupling, cleavage and conversion. The peptide of N amino acids in length is coupled to coupling reagent, phenylisothiocyanate (PITC), in a basic environment to form a phenylthiocarbamyl (PTC) derivative of the peptide. During cleavage, the PTC-peptide derivative is treated with a cleavage reagent, strong anhydrous acid, to form an unstable cyclic derivative of the peptide which rapidly cleaves into the more stable anilinothiazolinone (ATZ) derivative of the amino-terminal amino acid and a free peptide or amino acid of N−1 length which is the original peptide with the terminal amino acid removed. The final stage of the process, conversion, is performed manually away from conventional automated sequencing apparatus. The ATZ-amino acids produced by the Edman degradation, which are highly unstable in the presence of oxygen, are treated with aqueous acid to convert them into the more stable phenylthiohydantoin amino acids (PTH-amino acids) for chromatographic identification. The shortened peptide or protein is employed as a starting material for another cycle of the Edman degradation.

Liquid Phase Manual Edman Technique

In the early stages of development, the Edman degradation technique was performed manually. The following three papers describe this fundamental approach with certain modifications of the procedure. Edman, P., *Acta Chem. Scand.* 4, 283 (1950); Blomback, B., Blomback, M., Edman, P., and Hessel, P., *Biochem. et Biophys. Acta* 115, 371 (1966); and Konigsberg, W., *Methods in Enzymology* 11, 461 (1967). The reaction chamber is a test tube or similar vessel, sometimes provided with a special closure to permit addition and removal of reagents under an inert atmosphere. Reagents are added with a syringe or pipette and removed by the application of vacuum or by dissolving or extracting into a solvent. During coupling, the protein or peptides are dissolved into the coupling buffer. This procedure is ineffective for large proteins because they are relatively insoluble in such basic medium. Removal of the coupling base and undesired side products after coupling presents many problems. One problem in this technique is that the remaining peptide derivative can dry into a gummy film free from which it is difficult to remove reaction side products. Some procedures attempt to alleviate this problem by employing freeze-drying. Another problem is the removal of non-volatile materials because the PTC derivative of the peptide tends to be soluble in the same solvents as such materials to be removed. One approach is to remove the volatile reagents, leaving dried PTC-derivative and non-volatile side products. Then the residue is washed with one or more solvents chosen to dissolve undesired materials more readily than the PTC-peptide. However, the materials to be removed tend to be trapped into the matrix of undissolved PTC-peptide. Another approach is to agitate the PTC-peptide and other materials while dissolved in the coupling buffer with a nonpolar solvent which will not mix with the coupling buffer. Materials more soluble in the nonpolar solvent are extracted into the same, leaving the more polar PTC-peptide in solution in the polar buffer. Nonpolar solvent can dissolve materials to form a separate layer which can be removed by pipette. However, this procedure is likely to extract some of the PTC-peptide in the nonpolar solvent. Removal of the extraction solvent without also removing some of the polar solvent and PTC-peptide and without admitting oxygen into the vessel is difficult to perform.

Because the above coupling procedure is carried out in a liquid phase, the coupling buffer cannot be chosen for optimum coupling characteristics. A strong base promotes coupling most effectively. However, because large quantities of water are present in the liquid phase coupling medium, the pH level must be limited to below a value at which hydrolysis of the peptide occurs. Thus, a medium at a pH level of about 9 is employed as a compromise between the desired high pH to promote coupling and a lower pH to limit hydrolytic cleavage.

An anhydrous cleavage acid is added to the PTC-peptide to perform the cleavage step and is thereafter removed. Volatile acid is employed which is removed by evaporation after completion of the cleavage reaction. Thereafter, the ATZ-amino acid derivatives are removed in an extraction solvent while leaving the degraded peptide behind.

Solid Phase Manual Edman Procedure

A modification of the foregoing liquid phase Edman procedure is described in Schroeder, W.A., *Methods in Enzymology* 11, 445 (1967) and Jentsch, Jr., *Proc. First Int'l Conf. on Meth. in Protein Sequence Anal.*, 193 (1975). Here, the protein or peptide is non-chemically deposited onto a paper strip upon which it remains during the sequencing procedure. The major difference from the liquid phase procedure described above is that the coupling base and cleavage acid are supplied by exposure of the paper strip to a stationary atmosphere of the base or acid in the gas phase in a closed container.

The above procedure is useful for degradation of large proteins and peptides since it is not necessary to dissolve the sample for reaction. Instead, the peptide is distributed on a paper strip at a high dilution to form a thin film of large surface area. However, the above system requires excessively long periods of time to carry out one cycle of degradation. A contributing factor to such long time periods is that the gas phase reagents contact the peptide solely by convection, an inefficient procedure. Also, solvent extractions and drying are carried out without agitation or other means of forced circulation.

Another disadvantage of this procedure is that it is only effective in degrading relatively small segments of peptides or proteins. It is believed that this inefficiency is due to a significant extent to mechanical and extractive losses as well as failure to protect the reactants from oxygen.

Another disadvantage of this procedure is that different solvents must be employed to extract hystidyl and arginyl derivatives, which solvents tend to extract the peptide as well. It is believed that this is due to incomplete immobilization of the peptides on the paper strips.

Spinning Cup Automatic Sequencer

Automatic protein sequencers are described in Edman, P., and Begg. G., *Eur. J. Biochem.* 1, 80 (1967) and in U.S. Pat. No. 3,725,010. In such sequencers, the Edman degradation is performed in the same fundamental manner as the foregoing liquid phase technique. The primary difference is that the reactions are carried out in a film on the inside surface of the spinning cup and liquids are removed by overflowing the lip of the cup rather than by pipette or syringe. Reagents are added to the cup by a system of pumps and valves, and materials are removed by vacuum evaporation or by dissolving or extracting in non-polar solvents as in the foregoing liquid phase manual Edman procedure.

The sample is maintained as a film on the inside wall of the cup. One problem of the foregoing apparatus is that it is inefficient for the sequencing of small peptides. This is because the vigorously agitated film of sample on the wall of the cup is highly susceptible to dissolution in the washing and extracting solvents which are employed to carry away excess reagents, side products, and the desired ATZ-amino acid derivatives. Thus, small peptides are dissolved or suspended in such solvents and washed out of the spinning cup before complete sequencing. In U.S. Pat. No. 3,725,010, the use of a volatile coupling buffer which can be removed by evaporation is employed. However, a liquid extraction step is employed to remove a number of non-volatile materials from the peptides. In this step, relatively small peptides are extracted from the cup.

Another disadvantage of the spinning cup approach is that drying of the protein must be performed very carefully to maintain a thin film. Thus, if evaporation of solvents is attempted by immediate application of a high volume, the solution on the cup wall will boil and splatter to ruin the film. Thus, initial drying of the protein is performed by a gentle restricted vacuum. After the stable dried film is thus formed, drying is completed by application of successively higher volumes. If a full vacuum is not employed, some of the volatile reagents will remain on the cup wall which will combine with different reagents in other stages of the process to form insoluble salts which interfere with the degradation reaction. Such extensive drying is time-consuming and contributes substantially to the overall cycle time. Also, the system requires a high precision vacuum apparatus. Since various materials volatilized in a vacuum system combine in dead spaces to form solid salts, it is necessary to clean the system after each run for proper maintenance of the apparatus. The problem is so acute that some workers have found it necessary to completely redesign the vacuum system of the apparatus described in U.S. Pat. No. 3,725,010. Such a modification is set forth in Wittman-Liebold, B., *Hoppe-Seyler's Z. Physiol. Chem.* 354, 1415 (1973), wherein it is claimed that said redesign was necessary in order to operate the machine through any more than eight cycles of degradation on certain sensitive proteins.

Another disadvantage of the spinning cup sequencer is that it requires precise metering of reagents and solvents into the cup to assure that the same amount is delivered on successive cycles. Otherwise, unreacted or partially reacted protein in the cup builds up in a ring that is inaccessible to further reaction to the detriment of the degradation process. Such a metering system is complex and difficult to maintain.

The Liquid/Solid Phase Sequencer

Another type of automatic sequencer is set forth in Laursen, R. A., *Eur. J. Biochem.* 20, (1971). The peptide to be degraded is covalently linked to a gel-type of solid phase support contained within a tubular glass column forming a reaction chamber. All reagents and solvents are supplied in liquid form by pumping through the support material in the column. Such reagents and solvents are removed from the reaction column by replacement with other solvents or reagents.

A major difference of the above system in comparison to the foregoing sequencing procedures is that evaporation is not employed as a technique for removal of materials. Instead, the column is flooded with liquid throughout the entire process in order to maintain the solid support in a swollen, porous condition.

The above Laursen paper suggests that the swollen polymer beads of the support limits the procedure to the sequencing of peptides which are 30 or fewer residues in length. In Wachter, E., Machleidt, H., Hofner, H., and Otto, J., *FEBS Lett.* 35, 97 (1973), macroporous glass support is employed to permit sequencing of proteins and larger peptides.

A major disadvantage of the above system is that only liquid reagents are employed. Thus, complete covalent linkage of the peptide to the solid support is essential. This is because the cleavage acids are excellent solvents for proteins and peptides and would wash the unbound protein or peptide from the support material. This requirement, for complete covalent linkage limits the frequency of this technique to the peptide or protein coupling efficiency (approximately 30 to 60%). Another disadvantage is that because the gel-type supports are adversely affected by many solvents, only a limited selection of solvents is available to dissolve peptides for coupling to the supports. It is noted that such gel-type supports are most effective for retaining small peptides. Certain residues cannot be identified because of the required coupling techniques. Another disadvantage is that coupling is a lengthy tedious process.

A major problem in the above system is that the cleavage acid must be employed as the solvent for extraction of ATZ-amino acids from the reaction column because of the high solubility of the latter in the former. The cleavage acid also extracts undesirable materials from the column which can interfere with identification of histidine and arginine. Another disadvantage of employing the cleavage acid as the ATZ-amino acid solvent is that prolonged exposure of the ATZ-amino acids causes chemical changes which interfere with conversion of the ATZ-amino acids to any other than PTH derivatives.

Another restriction of this system is that the exchange of reagent and solvent liquids in the reaction chamber must be performed by pumping in other liquids since none can be removed by evaporation. Pumping rates are limited by column backpressure and so this exchange is relatively slow.

SUMMARY OF THE INVENTION AND OBJECTS

In accordance with the present invention, an improved method and apparatus is provided for the sequential degradation of protein or peptide chains in a reaction chamber by successive coupling and cleavage reactions. The peptide chains are immobilized on a macroporous reaction support surface such as macroreticular polystyrene or macroporous glass. For simplicity of description, as used herein, the term "peptide chains" will also apply to protein chains unless otherwise specified. Immobilization of the peptide chains may be accomplished either by covalent linkage or by adsorption onto the macroporous support matrix, as desired. The coupling reaction occurs by wetting the reaction surface with coupling reagent and passing a pressurized vapor stream of coupling base through the chamber to provide a basic coupling environment. After washing with a liquid solvent, a pressurized inert gas stream is directed through the reaction chamber to at least partially dry the surface. Then, a pressurized vapor stream of cleavage reagent is passed through the reaction chamber to cleave amino acid derivatives from the coupled chains. Such derivatives are extracted with liquid. A preferable technique for supplying the vapors of coupling base and cleavage reagent is to pass an inert carrier gas into liquid reservoirs containing the same for entrainment prior to passage through the reaction chamber. The same pressurized inert gas can be employed to dry the reaction surface and drive the liquid reagents in the system by the use of suitable valving.

It is a major object of the present invention to provide an improved method and apparatus for sequencing of protein or peptide chains which is less expensive than and overcomes the disadvantages of the sequencers of the prior art.

It is a further object of the invention to provide a sequencing system with increased yields which enables it to be employed for a larger number of cycles than that of the prior art.

It is another object of the invention to provide an automatic system for sequencing of proteins or peptides in a stationary reaction chamber which employs both liquid and gaseous reagents.

It is another object of the invention to provide a system with a significantly reduced cycle time in comparison to the prior art.

It is a further object of the invention to provide a sequencing system which minimizes losses of peptide by flowing the coupling base and cleavage reagent in vapor form past the immobilized peptide.

It is an additional object of the invention to provide a versatile sequencing apparatus which may be employed to sequence highly soluble small peptides which have been immobilized by covalent linkages to a substrate and also to sequence proteins without covalent linkage.

It is a further object of the invention to provide an improved reagent delivery system in which pressurized gas is employed to flow liquid and gaseous reagents through the reaction chamber using simplified valving.

It is an additional object of the invention to improve the volumetric efficiency of the apparatus so as to significantly reduce the required quantity of reagents.

It is an additional object of the invention to provide a sequencer which does not require means for applying a strong vacuum.

Additional objects and features of the invention will be apparent from the following description taken in conjunction with the accompanying drawings.

BRIEF DESCRIPTION OF THE DRAWINGS

FIG. 1 is a flow diagram of a sequencing method according to the present invention.

FIG. 2 is a schematic representation of apparatus for performing the present method.

DETAILED DESCRIPTION OF THE PREFERRED EMBODIMENTS

The present method is directed generally to the sequencing of proteins or peptides by repeated cycles coupling to a terminal amino acid, and cleaving the coupled amino acid derivatives. As the invention is particularly adapted to the basic Edman procedure set forth above, the present application will refer to that procedure. However, it should be understood that by appropriate modification, the method is also applicable to any other sequencing procedures which employ the same fundamental steps.

Methodology

Referring to FIG. 1 of the drawings, a brief summary of the present method is as follows. In step 10, the peptides are immobilized upon a reaction support surface, preferably macroporous, which is disposed in a reaction chamber. In step 11, a coupling reagent, PITC, is passed through the reaction chamber in liquid form to contact the immobilized peptide. During such contact, a pressurized vapor stream of coupling base vapor is passed through the reaction chamber to provide a basic environment for coupling of the PITC to the terminal groups of the peptides.

In step 12, a liquid washing solvent is flowed through the reaction chamber to wash the support surface and remove unreacted coupling reagent and other contaminants. In step 13, the reaction surface is at least partially dried of solvent by directing a pressurized stream of inert gas through the reaction chamber. Then, in step 14, a pressurized vapor stream of cleavage reagent entrained in a carrier gas is passed through the reaction chamber for sufficient time to cleave the ATZ-amino acid derivatives from the PTC-peptides.

In step 15, an inert gas is passed through the reaction chamber to dry the reaction surface thereby removing traces of cleavage reagent. In step 16, a liquid extraction solvent is flowed through the reaction chamber to extract and withdraw the cleaved ATZ-amino acid derivative. In step 17, the reaction surface is again dried with an inert gas stream to remove any remnants of extraction solvent.

Step 17 completes the cycle and prepares the surface for the following cycle, which commences with step 11. In step 18, performed apart from the reaction chamber, the liquid extracting solvent from step 16 containing the amino acid derivative is delivered to a test tube in a fraction collector. There, the ATZ-amino acid derivative is converted to a stable PTH-amino acid derivative for identification by known chromatographic techniques.

Referring to the present procedure in detail, in step 10 the protein or peptide is either (a) physically, or non-chemically, adsorbed onto the support surface or (b) covalently linked to the same. The support surface should include sufficient surface area to spread the protein or peptide into a thin layer to provide ready access to reagents. For this purpose, it is preferable that the solid support material be a macroporous material. Another advantage of such macroporosity is that the walls of the pores provide a barrier against the shearing forces of liquid reagent flow to reduce the wash-out loss of sample in comparison to a nonporous surface. The reactions are performed within the pores and so it is important that liquids and gases be able to circulate freely within the pores. By forming the support surface of rigid material, the pores are retained in a configuration which is sufficiently open to permit the free flow of said gases and liquids. Otherwise, such flow may be restricted to the extent that the reaction becomes a diffusional process which would slow the overall process to an unacceptable time period.

The reaction support surface is chemically inert to and does not dissolve in any of the reagents employed in the process. Thus, if a polymeric resin is employed as the matrix of the macroporous material, the polymer chains should not dissolve to an extent that the chains float free in the solvent, connected to the matrix only by chain cross-linkages or the like.

A preferred support surface is characterized as follows. To permit spreading of a typical peptide sample in a fine bore tube reaction chamber the support surface comprises macroporous particles with a total area of at least about 1 sq. meter per gram of particles. Excellent results are obtained with particles of 50–100 sq. meters per gram or more. This layer surface area permits the use of a relatively small particle bed and reaction chamber which conserves reagent and shortens drying times.

The average pore size of the macroporous support surface is preferably of sufficient size to permit free passage of large proteins. A preferable size for proteins and larger peptides is on the order of 70–1000 angstroms or more. Also, the material should be sufficiently rigid that the pores do not collapse during drying to a size at which flow into the pores is impeded. Such a macroporous surface allows gases and liquids to flow freely through the support rather than requiring penetration by diffusion and permits the rapid removal and exchange of reagents and solvents and the rapid flow of materials through the solid phase support under low pressure delivery.

Particularly effective reaction support surfaces include macroporous glass and macroreticular resin. With respect to the former, suitable porous inorganic materials with relatively high surface area in closely controlled pore diameters include the controlled pore silica glass beads sold under the designation GZO-3900 by Corning Biomedical Products Department, Medfield, Mass. Such unmodified controlled pore glass is suitable for adsorptive binding. In addition, amino aryl derivatives of such porous silica glasses are also distributed by the same company under the designation GAO-3940. The latter materials include reactive side groups which are suitable for immobilization by covalent linkage as set forth below.

A macroreticular resin which is particularly effective for adsorptive immobilization is an unmodified polymeric adsorbent sold in bead form under the same "Amberlite XAD-2" by Rohm & Haas Co., Philadelphia, Penn. A bead of this material comprises an agglomeration of a large number of small microspheres of synthetic insoluble crosslinked polystyrene polymer in a size from 20 to 50 mesh. This material may be modified to include an amine for covalent linkage immobilization as set forth below. This type of macroreticular resin is particularly useful in the present process because it does not swell or shrink significantly during solvent addition or removal. Thus, such resin can be dried completely and reagents supplied in the gas phase without pore collapse. The pores of this resin include voids on the order of 100 angstroms between the microspheres. Such pores are significantly larger than those of the gel-type resins employed in the aforementioned prior art Laursen et al liquid system. Such large pores allow free penetration of protein molecules significantly larger than those capable of penetrating the gel-type resins.

Referring again to step 10, one method by which the proteins and peptides may be immobilized in the macroporous support surface, such as controlled pore glass or microreticular resin, is by physical sorption, specifically adsorption, after deposition from a solution. The peptide is dissolved in an amount of solvent sufficient to fill the pores of the support surface. The peptide is permitted to soak into and be adsorbed by such pores. Thereafter, the solvent is removed, as by drying in a nitrogen gas stream, and then under a vacuum. Suitable solvents for this purpose include trifluoroacetic acid or formic acid. By this technique, the sample is distributed in a very thin layer. This prevents the sample from being buried in its own matrix. Because each molecule of the sample is fully exposed, it freely interacts with reagents in the surrounding gas or liquid phase. Also, because of such full exposure, it is unnecessary to employ a strong reagent to open up the sample matrix for extraction and washing.

Immobilization of protein or peptide by non-chemical or physical adhesion to the surface of the support material is effective to prevent wash-out of all but very small peptides because the coupling base in step 11 and cleavage reagent in step 14 are supplied in vapor form. Thus, after drying of the protein or peptide onto the solid surface, it is not subjected to any liquid solvent in which it is highly soluble and so the protein or peptide is retained on the surface.

It may be necessary to covalently link relatively small protein segments or peptides to the surface for immobility. Such covalent coupling should only be employed when there is excessive wash-out by the use of physical adsorption. This is because the procedure for covalent coupling is relatively comlex and may have undesirable side effects, such as irreversible binding of some of the amino acid units to the solid support so that thiazolinone derivatives cannot be eluted for identification. However, there may be no alternative for acceptable immobilization of small peptides.

Any conventional technique for covalent coupling of peptides to solid support surfaces may be employed. Such systems have been studied extensively with respect to the gel-type resins of the liquid/solid phase sequencer which, as discussed above, require covalent bonding. The systems are also applicable to the macroreticular resin of the present invention which has been substituted with amino groups. One technique is an article by Previero, A., et al., *FEBS Lett.* 33, 135 (1973). In this procedure, a di-substituted carbodiimide coupling reagent is employed to form a bond between the primary amino groups on the resin and the carboxylic acid groups at the terminus of the protein or peptide. Such bonds are the same as those which link the amino acid units together in protein or peptide. Accordingly, other methods which can be employed in synthesizing proteins can also be employed to bind proteins or peptides to solid phase supports including primary amino groups. A general discussion of such techniques is set forth in *The Peptides*, Vol. I, E. F. Schroeder and Lubke, Academic Press, New York, 1966. The techniques for covalent bonding which are particularly applicable to special classes of peptides are set forth in articles by Horn et al., *FEBS Lett.* 36, 385 (1973); and Laursen et al., *FEBS Lett.* 21, 67 (1972).

At the present time, applicant is not aware of a commercially available macroreticular resin of the XAD-2 type described above which has been substituted with amino groups for use in the foregoing coupling techniques. Preparation of such primary amine derivatized resin may be performed as follows. The cross-linked polystyrene resin of the XAD-2 type is first chloromethylated by the reaction of the resin with chloromethyl methyl ether in a chloroform mixture. Thereafter, the chloromethylated resin is dried and reacted with ethylenediamine for conversion to a primary amine resin. The details of the formation of this resin are set forth hereinafter.

There are a wide variety of techniques known for the linkage of proteins or peptides to macroporous glass as of the type including aromatic amino groups set forth above. For example, see, Mason, R. D., et al, *Biotech. Bioeng.*, 14, 367 (1972).

Steps 11-17 of the present process are performed upon the protein or peptide immobilized on the above macroporous surface in a flowthrough reaction chamber. For simplicity of description, it will be assumed that the macroporous surface comprises a plurality of beads formed into a bed in such reaction chamber. The chamber is a flowthrough glass tube through which gases and liquid reagents are passed in the same direction through suitable valving.

In step 11, a coupling reagent is passed through a cartridge defining a reaction chamber in sufficient quantity to wet the immobilized protein or peptide. In a typical Edman degradation scheme, the coupling reagent comprises phenylisothiocyanate (PITC). This material is conventionally supplied in a solution of volatile solvent such as heptane in a dilution of, say, 17% by volume. This renders the relatively viscous PITC easier to meter and to form a uniform layer on the support surface. After the surface has been wetted with the PITC reagent the heptane, if present, is evaporated to dryness from the reaction surface by passing an inert gas through the chamber until the support surface contains only PITC liquid. Then the coupling base is directed through the reaction chamber in vapor form. An excellent coupling base comprises trimethylamine (TMA). This reagent provides a highly basic environment of about pH 10.5 for the coupling reaction.

It is an important feature of the present invention to supply the coupling base for step 11 in a vapor form. This prevents wash-out of the peptide or protein in a liquid coupling reagent, a problem if the protein or peptide is physically adsorbed onto the reaction surface. Another advantage of supplying coupling base in vapor form is that this avoids extensive drying after completion of the coupling reaction. A preferred technique for vaporizing the coupling base is to pass an inert carrier gas through a reservoir containing a solution of TMA 25% by volume in deionized water to entrain the base in the carrier gas which is swept through the reaction chamber. In an alternative, the coupling base may be maintained as a vapor and passed through the reaction chamber under its own pressure.

Coupling reagents other than the foregoing may be employed which react selectively and efficiently with the terminal amino acid in a peptide or protein in a way that the adjacent peptide is activated for a subsequent cleavage reaction which selectively breaks only this bond. At the present time, known coupling reagents which perform this function react with the amino-terminal amino acid. Alternative reagents include other isothiocyanate derivatives such as methylisothiocyanate. Fluorescent isothiocyanate derivatives should offer increased sensitivity as for detection of microsamples. In addition, it may be possible to employ other coupling reagents such as carbon disulfide and other isothiocyanate derivatives.

Alternative means of supplying coupling reagent to the cartridge may also be employed. Since it is required only that coupling reagent and coupling base to present in the cartridge at the same time, it is possible that the coupling reagent could be provided as a continuous vapor stream in conjunction with the coupling base.

Alternative coupling bases may also be employed. For sequencing with isothiocyanate coupling reagents, the coupling medium is a strong base in an aqueous environment. The base should not be so strong as to cause cleavage of peptide bonds. However, by performing the coupling reaction in a gaseous environment, hydrolytic cleavage is grearly reduced and so strong bases are permissible. Quadrol, dimethylallylamine (DMAA), and dimethylbenzylamine (DMBA) have been employed in the aqueous phase as coupling bases in sequencers of the spinning cup type. Other strong bases which perform in the foregoing manner may also be employed.

After coupling as set forth above, in an optional step, the reaction chamber may be evacuated by sweeping inert gas through the same to purge it of any residual coupling base vapor.

In step 12, a liquid washing solvent is passed through the reaction chamber to remove unreacted coupling reagent and side products of the coupling reaction. The washing solvent is one which will dissolve unreacted coupling reagent and side reaction products without dissolving or damaging the PTC-peptide chains in the cartridge. A nonpolar aromatic solvent such as benzene is particularly effective for this purpose.

In step 13, the support surface is dried by passing an inert gas through the reaction chamber to remove the washing solvent. In an optional step, the chamber also may be purged by vacuum.

In step 14, a cleavage reagent, preferably an anhydrous acid such as trifluoroacetic acid (TFA), is passed through the reaction chamber in vapor form. This reagent provides an environment at a pH of about 1.0 to perform the cleavage reaction. Vaporizing the cleavage reagent is performed by bubbling inert carrier gas through a reservoir of liquid cleavage reagent.

The cleavage reagent is a strong anhydrous acid. If water is present, cleavage of peptide bonds other than the terminal one can occur producing multiple peptide fragments. It is possible that anhydrous hydrogen halide gases such as HCl, HBr, or HI could be supplied from a pressurized source without the requirement of employing an inert carrier gas.

In step 15, inert gas is again swept through the reaction chamber to purge the same of residual cleavage reagent vapor. Thereafter, in step 16, a liquid extraction solvent is directed through the reaction chamber to remove the cleaved amino acid derivative and carry the same to a test tube in a fraction collector. The extraction solvent is one in which the ATZ-amino acid derivatives are readily soluble and in which the remaining peptide chains are insoluble. Any solvent of this type may be employed. Such solvents may include 1-chlorobutane, benzene, chloroform, and ethylene dichloride, alone or in combination. An effective solvent comprises 0.1% solution of acetic acid in ethyl acetate. In step 17, the support surface is again dried by passage of an inert gas stream to prepare the system for another cycle commencing at step 11 as set forth above.

Conversion in step 18 is performed by a conventional technique. There, the ATZ-amino acids are rearranged to form the stable PTH-amino acids by reaction with a suitable acid in an aqueous environment. This conversion reaction can be performed on a number of extracted ATZ-amino acid derivatives simultaneously or sequentially. After conversion, the residues can be identified as by conventional gas chromatography.

A relatively inexpensive source of inert gas is a pressurized source of nitrogen gas. However, any other gases inert to the conditions of reaction such as helium and argon, could also be employed.

It may be desirable to provide the above system with a vacuum to assist the drying and purging functions of the inert gas as set forth above. Thus, in each step in which inert gas is passed through the system to remove a reagent, it may be accomplished by the application of a vacuum downstream of the reaction chamber to decrease the drying time.

An important feature of the present invention is the use of a positive pressure flow of inert gas for drying and of coupling base and cleavage reagent vapors. This significantly shortens the sequencing cycle times. The inert gas purges the reagents by displacement in a system of high volumetric efficiency. For example, inert gas under moderate pressure, e.g., 20 psi, flows through the reaction chamber at a rate at which the entire gas volume in the chamber is exchanged over 1000 times per minute for rapid and complete displacement. Even flow which accomplishes an exchange of at least 100 times per minute is vastly superior to the stagnant evaporation of reagents in the manual Edman technique described above. Since the film of reagent to be removed is dispersed in a very thin layer over a large area of the macroporous surface, the flowing inert gas flow has ready access to the same for rapid drying.

An inexpensive convenient technique for supplying liquid reagents is to employ pressurized inert gas, as from the same source as the inert gas employed for drying to urge such liquids through the reaction chamber.

The Apparatus

FIG. 2 illustrates a schematic representation of an automated apparatus which is particularly adapted for performing the above method for sequencing peptide or protein. Pressurized inert gas, nitrogen, is supplied from a suitable source, pressurized cylinder 30 and is passed through oxygen trap 31, as of the hot copper wire type. Source 30 is connected to the main inert gas manifold 32 via line 34 which includes a gas pressure regulator 36 and a pressure gauge 38 to monitor the pressure in line 34. In typical operation, the pressure is reduced in regulator 36 to 20 psi prior to flow into manifold 32. Inert gas source 30 is also connected to a controlled temperature and nitrogen atmosphere box, designated dotted line 40, through line 42 controlled by on-off valve 44 which, in an open position, supplies rapid flow of inert gas to purge box 40. Source 30 is also connected to fraction collector 46 through line 48 which includes a pressure regulator 50 and pressure gauge 52. Valve 54 interconnects fraction collector 46, line 48 and a vacuum source 56 which functions as set forth hereinafter. Lines 34, 42 and 48 are preferably formed of oxygen impermeable materials.

Detachably mounted cartridge 58 defines a flow-through reaction chamber in which the aforementioned particles of reaction support surface are deposited in a bed. Suitable dimensions for the reaction chamber are 1 mm i.d. × 40 mm/length. The bed of support particles is retained between inert screens at each open end.

Cartridge 58 is connected to the remainder of the flow system through a ten inlet position selector valve including inlet ports P1 through P10, inclusive, connected to a single outlet line 62. Valve 60 is a rotary face seal valve which may connect any of the inlet ports P1 through P10 to outlet line 62 while blocking flow through the remaining 9 inlet ports. The 10 positions of the valve are radially spaced and cyclically ordered so that the 10 ports must be selected in order, P1 through P10, inclusive. A suitable valve 60 is the type R6000 rotary Cheminert valve supplied by Laboratory Data Control, Division of Milton-Roy Corp. modified to include 10 rather than 6 inlet ports.

A brief description of the flow apparatus between manifold 32 and valve 60 is as follows. Liquid reagent delivery reservoirs 64, 66, 68, and 70 are connected at their inlet end to inert gas manifold 32 by lines 72, 74, 76, and 78, respectively. All of such inlet lines are directed into the upper portion of the reservoirs above a predetermined liquid reagent level in the same. Reservoir outlet lines 80, 82, 84 and 86 connect the reservoirs in the same order to ports P1, P3, P5, and P9, respectively. One end of reservoir outlet lines 80, 82, 84, and 86 projects to the lower portion of reservoirs 64, 66, 68, and 70, below the predetermined liquid reagent level in the reservoirs. Flow restrictors 88, 90, 92, and 94 are included in feed lines 80, 82, 84, and 86, respectively, to adjust flow rates from their respective reservoirs through valve 60. Suitable flow restrictors comprise coiled tubing of a length selected to provide resistance to flow for the desired flow rate.

In the system, in a non-selected port position, flow is blocked at valve 60. When the selected port is opened, gas flowing through the supply lines into the upper portion of the selected reservoir 88, 90, 92, or 94 forces the liquid therein into the feed lines through only the selected port of the valve in a continuous liquid stream.

Reservoirs 96 and 98 are provided to supply reagent through valve 60 entrained in the pressurized inert gas stream in vapor form. Supply lines 100 and 102 interconnect manifold 32 and valves 104 and 106, respectively. Lines 108 and 110 are connected to valves 104 and 106, respectively, and project into the lower portion of reservoirs 96 and 98, respectively, terminating in fritted glass spargers at the lower portion of said reservoirs below the predetermined liquid level therein to form fine bubbles of inert gas in the reagent. Lines 108 and 110 are provided with variable flow restrictors 111 and 113, respectively. Reservoir outlet lines 112 and 114 interconnect the upper portion of reservoirs 96 and 98, and valves 104 and 106, respectively. Lines 116 and 118 interconnect valves 104 and 106 and valve 60. Line 116 splits into lines 116a connected to port P2 of valve 60 and line 116b connected to port P4. Line 118 is connected to port P7 of the same valve. Lines 120, 121 and 122 interconnect manifold 32 and ports P6, P8 and P10 of valve 60 for direct supply of only inert gas to chamber 58.

In the above system, each of ports P1 through P10 is operatively associated with outlet 62 to form a gate which is closed to flow through any port of the valve other than the selected one. In this manner, valve 60 forms a valve assembly in which each port forms a part of a gate operative between an open and closed position. Valves 104 and 106 cooperate with this valve assembly to select flow to inert gas only or reagent from reservoirs 96 or 98, respectively, depending upon the position of valves 104 and 106. Thus, when port P2 of valve 60 is opened, valve 104 is in a bypass position, as illustrated by the solid lines in FIG. 1, so that only inert gas flows through chamber 58. When the same valve 104 is actuated to a second position as indicated by the dotted lines, inert gas flows through line 100 and 108 and through the fritted glass in the bottom of reservoir 96 to bubble upwardly through the liquid contained therein until it becomes essentially saturated with vapor of the same liquid upon reaching the gas head space in the reservoir and passing out line 112 back through valve 104 and through lines 116 to ports P2 and P4. Valve 106 has two similar operating positions as that of valve 104 and serve the same function of normally bypassing reservoir 98 when in a first position and, when actuated to a second position, to pass into the reservoir and become saturated with the reagent contained therein prior to passage into line 118. Thus, when valves 102 and 104 are in their first or non-actuated positions, they serve to isolate reservoirs 96 and 98 from contaminating one another and from contaminating the other reagent and solvent reservoirs 64, 66, 68 and 70 connected to manifold 32. This is a beneficial feature of the present invention because reservoir 96 is intended to contain trimethylamine or other coupling base while reservoir 98 contains trifluoroacetic acid or other cleavage reagent, each of which adversely affects the process if it crosscontaminates the other reservoirs.

Cartridge 58 is connected at its outlet end through line 126 to valve 128. Valve 128 is connected to a vacuum pump 130 through line 132 which includes a flow restrictor 134 and includes a first operating position illustrated by the solid line in which flow is open from line 126 through line 138 to valve 136 and a second operating position indicated by the dotted lines in which a vacuum is drawn on the reaction chamber 58.

A line 140 is connected to valve 136 and projects into the bottom of trap 142 so that the gas passes through the liquid reagent therein. The outlet from trap 142 passes through line 144 into the bottom of trap 146 and from there through line 148 into trap 150. Trap 142 may be charged with a small amount of a concentrated sulfuric acid so that basic vapors are absorbed from the gas flow and liquid phase solvents float as a separate layer on top of the sulfuric acid. Inert gas and non-basic vapors pass through trap 142 through line 144 into trap 146 charged with sodium hydroxide solution which traps acidic vapors from the gas stream. The gas then passes through line 148 into trap 150 which contains activated charcoal to adsorb organic vapors from the gas stream.

Referring to the conversion section of the apparatus, a reservoir 152 is provided for conversion reagents such as dilute acid. Pressurized inert gas is supplied through line 154 to an inlet above the predetermined liquid level in the reservoir. Line 156 projects to the lower portion of the reservoir below the liquid level for receiving liquid reagent in a continuous stream from the reservoir and carrying the same through flow restrictor 158 into valve 160. Another line 162 interconnects manifold 32 and valve 160 and includes a variable flow restrictor 164. Line 166 interconnects valves 160 and 136. Valve 160 is operable between a first or non-actuated position in which inert gas only flows through lines 162 and 166, and a second or actuated position in which gas pressure from line 154 forces liquid reagent from reservoir 152 through line 156 and into line 166.

An outlet 168 from valve 136 is positioned above a sample receiving station for test tubes 170 disposed in a rotatable carousel 172 with recesses to hold a plurality of test tubes upright. Means, not shown, are provided for synchronously rotating the turntable to the next test tube once during each cycle. An outlet gas line 174 interconnects the interior of enclosed fraction collector 46 and valve 54. An outlet line 178 with a flow restrictor 180 is provided between valve 54 and a vacuum source 56. A pressure gauga 184 is provided to monitor the pressure in the fraction collector. The fraction collector may be maintained at slightly higher than atmospheric pressure to prevent oxygen contamination of its inert gas environment.

To summarize the foregoing with respect to valve 136, it is operable between a first and second position. In the first position, illustrated by the solid lines, the fluid in line 166 flows into fraction collector 46. With valve 160 in its first or non-actuated position, inert gas flows through valve 136 into collector 46. With valve 160 in an actuated position, liquid reagent from reservoir 152 is directed into test tubes 170 an the collector. With valve 136 in a first position the fluid from valve 128 bypasses the fraction collector and is removed from the system through the series of traps 142, 146, and 150.

In the second position of valve 136, illustrated by the dotted lines, fluid from line 166 bypasses the fraction collector and flows out of the system through the aforementioned traps. With valve 128 in its first or non-actuated position, the effluent from cartridge 58 is directed through valve 136 into test tubes 170.

In a first position of valve 54, inert gas flows into the fraction collector through line 174 as indicated by the dotted line position of the valve. In a second position, the fraction collector is evacuated by vacuum source 56 as indicated by the solid line.

Variable flow restrictor 164 serves to adjust the flow rate of inert gas through line 166 so that when valves 136 and 160 are open, inert gas flows through lines 162, 166 and 168 and is directed into the test tube 170 at the receiving station in the fraction collector to provide a maximum drying rate without cavitation and splashing of solvent.

Flow restrictors 158, 90, 92, 94 and 98 serve to restrict flow rates of liquid from the corresponding reservoirs. The flow restrictors can be selected to control the total volume delivery for a given time interval to within close tolerances.

Variable flow restrictor 111 and 113 control the flow rates of the gas phase reagents from reservoirs 96 and 98. Such variable flow restrictors permit the control of flow rates independent of the length of delivery time.

Flow through the reaction support surface in chamber 58 creates resistance to fluid flow. Flow restrictors 111, 113, 88, 90, 92, and 94 are selected to provide a resistance to fluid flow substantially in excess of the flow resistance within cartridge 58. Accordingly, by placing the cartridge in series with any of these flow restrictors, the flow rates through the system are substantially unaffected by differences in flow resistance within the reaction chamber caused by different types of sample preparations.

In the above system, inert gases may initially be supplied to housing 40 at a rapid rate by opening valve 44 to purge oxygen from the system as after replacement of cartridge 58 or when the enclosure is opened. Thereafter, valve 46 is closed and during continuous operation, a continuous bleed of inert gas may be supplied through line 186 connected to a variable flow restrictor 188. This bleed maintains the enclosure under slightly positive inert gas pressure to prevent contamination by oxygen.

Means are provided for heating the interior of housing 40 and all of the elements therein to maintain reaction cartridge 58 at the desired optimum temperature for reaction. Such means include a heater 190 and a temperature sensor 192 for automatic control of the heater. To maintain a uniform temperature, a fan 194 circulates the inert atmosphere past the heating element of heater 190 and thermal sensor 192 to heat all components of the system. In this manner, all of the lines are heated prior to the flowing of fluids through cartridge 58. This permits the liquids and gases to equilibrate to the desired temperature and thereby assist in maintaining a uniform reaction temperature. In addition, other temperature control means may be provided for reaction chamber 58 such as a fluid jacket, not shown.

Operating Procedure

The following description of the operating procedure will commence with the first cycle of protein or peptide chain degradation. This cycle is repeated until the desired degree of protein or peptide degradation is accomplished.

Prior to commencing operation of the automated apparatus at port P7, the protein or peptide is immobilized as set forth above and placed within reaction chamber 58 remote from its position within the apparatus. Thereafter, cartridge 58 containing the immobilized protein or peptide is detachably mounted in the apparatus as illustrated in FIG. 2. Housing 46 is flushed by opening valve 44 and admitting inert gas. Then, valve 44 is closed and a continuous bleed of inert gas maintained at a slightly positive pressure within the housing by passage through line 186. Also, heater 190 and fan 194 are actuated to circulate warmed inert gas to maintain a constant desired temperature for the system. The following description will segment the series of steps in accordance with the corresponding sequential positions P1 and through P10 of valve 60 in conjunction with the remainder of the system.

Cycle Zero

Many proteins and peptides are found to be partially "blocked" by some chemical moiety covalently linked to the amino terminus in such a way that the coupling reaction of the Edman degradation cannot take place. In some cases, the chemical moiety thus attached may be removed by treatment with cleavage acid as during the normal cleavage reaction of the degradation. In such cases, if the sample is treated by the normal Edman degradation, beginning with the coupling reaction, only the unblocked amino terminus portions of the sample would enter the degradation reaction on the first cycle. The blocked portion would not be degraded until the second cycle of operation, after unblockage during the cleavage reaction of the first cycle. As a consequence, it is preferable to start all samples at Step 7 of the procedure to be described hereinafter. This stage of the process, during which the sample is subjected to the conditions of the cleavage reaction of the Edman degradation, is termed "cycle zero" of the degradation. It does not yield any amino acid derivative in the fraction collector, but serves only to unblock any portion of the sample that may be blocked before commencing the first cycle of the Edman degradation.

STEP 1
  Function — Bypass
  Time — 1 second
  Flowrate — 10 ml/min

Valve 60 is advanced to position 1 in which flow from line 80 proceeds through port P1 into cartridge 58. For purposes of the present discussion, the position number is defined as that position of valve 60 in which only the corresponding port number is open or actuated. For most samples, reservoir 64 will be empty so that position 1 constitutes a spare line. In the normal bypass mode, the duration of this step is only sufficient to move to the next position, e.g., 1 second. One function of this line will be as an optional source of labelled coupling reagent such as radioactive PITC for microsamples as set forth hereinafter. Assuming that reservoir 64 is empty, at position 1, valves 104, 106, 128, 136 and 160 are in their non-actuated positions so that the following conditions are in effect: reservoirs 96 and 98 are isolated from the rest of the system with valves 104 and 106 in the bypass position so that inert gas fills lines 116 and 118. Gas flowing from cartridge 58 passes through valve 126 to line 138 and then through valve 136 to line 140 and through traps 142, 146, and 150 to the atmosphere. Inert gas from line 162 passes through valve 160, line 166, valve 136 and line 168 to be directed into the test tube 170 in the sample receiving station. The tube at this position in every cycle after the first one contains ATZ-amino acid derivative from the previous cycle of operation. The inert gas stream evaporates the solvent in which the derivative is dissolved. The above condition of the flow system is the one employed at steady state and remains in effect through all subsequent steps in the cycle, unless otherwise specified.

STEP 2
  Function — bypass
  Time — 1 second
  Flowrate — 100 ml/min

Valve 60 advances to port P2, another bypass position, of one second duration. Inert gas is admitted from line 116a through port P2 to line 62 and cartridge 58.

STEP 3
  Function — coupling reagent delivery
  Time — 8 seconds
  Flowrate — 0.150 ml/min Valve 60 is advanced to position 3 to admit flow of coupling reagent from reservoir 66 in continuous liquid form through line 82 into cartridge 58. The duration of this step, e.g., 8 seconds, and flowrate, e.g., 0.150 ml/min, are adjusted to allow sufficient coupling reagent to flow into the cartridge to thoroughly wet the reaction support surface therein.

STEP 4a
  Function — solvent removal
  Time — 15 seconds
  Flowrate — 100 ml/min Valve 60 is advanced to position 4, admitting inert gas flow from line 116b through port P4, line 62 and cartridge 58. The inert gas serves to drive the slug of liquid coupling reagent delivered during step 3 through line 62 into the cartridge to saturate the reaction support surface therein. Excess liquid is forced out of the cartridge and eventually to trap 142 where it is retained. Inert gas flow is continued long enough to evaporate heptane solvent from the reaction support surface, leaving only PITC liquid.

STEP 4b
   Function — delivery of coupling base
   Time — 585 seconds
   Flowrate — 2.5 ml/min Valve 60 remains in position 4 but valve 104 is actuated to direct inert gas through line 108 to bubble through coupling base, trimethylamine (25% solution in water), in reservoir 96 where it leaves through line 112 in saturated condition and is delivered to cartridge 58. This flow of coupling base through cartridge 58 is maintained to provide a highly alkaline gas phase environment to permit the coupling reaction to take place. A large excess of coupling base is provided to assist the reaction. Since the coupling base is in vapor form, there is no tendency to wash sample from the cartridge. The coupling base is provided for a sufficient time to complete the coupling reaction.

STEP 5a
   Function — cartridge wash and delivery of washing solvent
   Time — 4 seconds
   Flowrate — 0.52 ml/min Valve 60 is advanced to position 5 so that gas from line 76 exerts pressure on the upper surface of the washing solvent, benzene, in reservoir 68, directing a continuous solvent stream through line 84 through port P5 and cartridge 58. The washing solvent dissolves and washes away unreacted coupling reagent, reaction side products and any residual coupling base vapor. The wash solvent and waste products proceed through valve 126 to line 138 and then through valve 136 to line 140 and into trap 142 where they collect and remain. Simultaneously, valve 160 is actuated to direct conversion reagent from reservoir 152 under inert gas pressure from line 154 through line 166 and into fraction collector housing 46 via valve 136 and line 168 into the test tube 170 in the sample receiving station. After the first cycle, this test tube contains the ATZ-amino acid derivative from the previous cycle of degradation from which solvent has been dried. This conversion reagent remains in the test tube until it eventually evaporates, e.g., 20 to 60 minutes, during which time the conversion reaction takes place.

STEP 5b
   Function — continue cartridge wash
   Time — 56 seconds
   Flowrate — 0.52 ml/min Valve 60 remains in position 5 while washing solvent from reservoir 68 continues to flow through cartridge 58. Then valve 160 returns to its non-actuated position terminating delivery of conversion reagent from reservoir 152.

STEP 6a
   Function — drying and fraction collector advance
   Time — 10 seconds
   Flowrate — 100 ml/min Valve 60 is advanced to position 6 in which inert gas from line 13 passes through cartridge 58 at maximum flowrate to dry washing solvent from the reaction support surface therein. This stream continues through valve 128, line 138, valve 136, and line 140 through the series of traps. Concurrently, carousel 172 is advanced to its next position so that the next test tube in rotation is delivered to the sample receiving station in preparation for delivery of the amino acid derivative from the cycle of degradation being performed.

STEP 6b
   Function — drying
   Time — 50 seconds
   Flowrate — 100 ml/min

With valve 60 remaining in position 6, and inert gas flowing through cartridge 58 from line 120, valve 128 may be actuated to apply a vacuum on line 132 to the lower end of cartridge 58 to assist the removal of the last traces of washing solvent from the reaction support surface. This is an optional step. This step would be the normal point for interruption of the degradation procedure for shutdown or the like by actuation of a last cycle switch, not shown.

STEP 7
   Function — delivery of cleavage reagent
   Time — 700 seconds
   Flowrate — 2.5 ml/min Valve 60 advances to position 7 and valve 106 is actuated to admit cleavage reagent from line 118. The inert gas travels through line 102, valve 106, line 110 and bubbles through cleavage reagent, TFA, and upwardly through valve 106, line 118 and through port P7. In this manner, the cleavage reagent is saturated in the inert gas for delivery into cartridge 58. This reagent is a strong acid to provide an acidic gas phase environment for performance of the cleavage step. Cleavage reagent may be delivered in vast excess without adversely affecting the reaction and so is passed until completion of cleavage.

STEP 8
   Function — purge
   Time — 180 seconds
   Flowrate — 100 ml/min

Valve 60 advances to position 8 to admit flow of inert gas through line 124 and port P8 through cartridge 58. If desired, a vacuum may be applied by actuating valve 128 to purge all traces of cleavage reagent from cartridge 58. This purge should be performed thoroughly as the cleavage reagent vapors tend to condense in the cartridge on a protein or peptide sample. If allowed to remain, the cleavage reagent could promote dissolution of the protein or peptide in the extraction solvent delivered in the following step to cause washout. This is a relatively long step to permit thorough evaporation of any condensed cleavage reagent in the cartridge. During step 8, valve 54 is actuated which admits low pressure nitrogen from line 48 through line 174 into fraction collector housing 46 to release the vacuum in preparation for delivery of solvent into the fraction collector during the next step.

STEP 9
   Function — extraction of amino acid derivatives
   Time — 20 seconds
   Flowrate — 0.78 ml/min Valve 60 advances to position 9 and valve 136 is actuated to the position indicated by the dotted line.

Extraction solvent, e.g., ethyl acetate, is delivered through port P9 to cartridge 58, line 138, valve 136, and line 168 to the test tube positioned in the sample receiving station below the delivery tube in the fraction collector. Valve 176 remains actuated so that the interior of fraction collector housing 46 is maintained at a slightly positive pressure so that there is no suction applied to the extraction solvent entering line 168. The ATZ-amino acid derivative produced during this cycle of degradation is dissolved by the extraction solvent as it passes through cartridge 58 and is delivered in solution to the test tube. During the remaining steps of the current cycle in the first four steps of the following cycle, solvent will be evaporated from the test tube leaving the dry amino acid derivative in the bottom of the same in the beginning of step 5 of the following cycle.

STEP 10a
 Function — drying
 Time — 10 seconds
 Flowrate — 100 ml/min

Valve 60 advances to position 10 to admit inert gas from line 112 through port P10 and into cartridge 58 to dry most of the extraction solvent therefrom.

STEP 10b
 Function — drying
 Time — 50 seconds
 Flowrate — 100 ml/min

Valve 60 remains in position 10 while valve 128 is actuated to apply a vacuum from line 134 to assist in removal of the last traces of extraction solvent from the cartridge. The application of this vacuum is an optional step. This completes one cycle of degradation. For the next cycle, step 1 is repeated.

In an optional procedure, reservoir 64 would include a coupling reagent labelled as with radioactivity or fluorescence to increase the sensitivity for microsamples. In this instance, the procedure described with respect to step 3 would be applicable to step 1 and the procedure described with respect to step 4 would be applicable to step 2. Corresponding adjustments in step lengths and flowrates may be necessary to account for the smaller quantity of sample in the cartridge.

Because of the modular nature of the cartridge, a number of samples may be preloaded into several cartridges and would be available for loading into the apparatus upon completion of a total degradation. Since the samples are filled externally to the apparatus, the system may be reloaded directly after removal of the preceding cartridge to minimize system downtime.

It should be understood that the foregoing method and apparatus may be modified without departing from the scope of the present invention. For example, with alterations which would be apparent to those skilled in the art, the system may be employed for peptide or protein synthesis. Also, the overall system may be automated.

A further disclosure of the nature of the present invention is provided by the following specific examples of the practice of the invention. It should be understood that the data disclosed serve only as examples and are not intended to limit the scope of the invention.

The amino acid sequences set forth in the following examples are tabulated in the three-letter amino acid code, which is defined as follows:
 AEC — S-aminoethyl cysteine
 ALA — alanine
 ARG — arginine
 ASP — aspartic acid
 ASN — asparagine
 ASX — either aspartic acid or asparagine
 CYS — cysteine
 GLN — glutamine
 GLU — glutamic acid
 GLY — glycine
 GLX — either glutamic acid or glutamine
 HIS — histidine
 ILE — isoleucine
 LEU — leucine
 LYS — lysine
 MET — methionine
 PHE — phenylalanine
 PRO — proline
 SER — serine
 THR — threonine
 TRP — tryptophan
 TYR — tyrosine
 VAL — valine
 XXX — undetermined

EXAMPLE 1

A primary amine derivative of type XAD-2 resin was prepared for use as a sequencing support as follows:

400 grams of the 20 to 50 mesh type XAD-2 resin were dried at 42° C under vacuum for 48 hours. The dry resin was stirred in 500 milliliters of chloroform on an ice bath while a mixture of 60 milliliters of stannic chloride and 400 grams of chloromethyl methyl ether was added dropwise. The stannic chloride and chloromethyl methyl ether mixture was added over a period of 45 minutes and then stirring was continued for an additional hour on the ice bath. The reaction solution was separated from the resin, and then the resin was washed twice with 3:1 dioxane-water, twice with 3:1 dioxane-3N HCl, twice with 3:1 dioxane-water, twice with 5:1 dioxane-water, once with 100% dioxane, twice with 3:1 dioxane-methanol, once with 2:1 dioxane-methanol, twice with 1:1 dioxane-methanol, once with 1:5 dioxane-methanol and twice with 100% methanol. Then the resin was dried at 85° C under vacuum for 24 hours. 300 grams of the resin was mixed with enough ethylene diamine to cover the resin bed and was allowed to sit for 24 hours with occasional agitation at room temperature. The resin was separated from the ethylene diamine and washed three times with water, twice with 10% formic acid, twice with 40% formic acid, once with 88% formic acid, four times with water, 3 times with 6N HCl, three times with water, and twice with acetone. Then it was dried overnight at 70° C under vacuum. The primary amine resin hydrochloride thus obtained was ground in a spice grinder and separated into various size ranges as described above for the underivatized XAD-2 resin.

EXAMPLE 2

16.1 milligrams of S-aminoethyl insulin B chain were dissolved in 300 microliters of 98% formic acid and dried onto 150 milligrams of 60 to 120 mesh primary amine resin hydrochloride which had been prepared as described in Example 1. 300 microliters of 2M 1-ethyl-3-(3-dimethylaminopropyl)-carbodiimide.HCl at pH 4.75 were added, and the mixture incubated overnight at 4° C to covalently couple the peptide to the resin. The resulting resin-peptide preparation was washed twice with water, twice with 0.1 N HCl, and twice with methanol to remove excess reagents, and the preparation was dried in vacuum. 13.4 milligrams of the preparation (approximately 370 nanomoles) were loaded into a cartridge and sequenced by the modified operating procedure described above for apomyoglobin. The ATZ-amino acid derivatives were hydrolyzed with 6N HCl at 110° C for 20 hours to recover free amino acids, and the amino acids were analyzed on a Durrum D500 amino acid analyzer to obtain the following sequence listed as "Exp.". The known sequence is also listed below for comparison.

known sequence of sperm whale apomyoglobin is also listed below for comparison.

```
              1             5                  10
Exp.:   VAL-LEU-XXX-GLX-GLY-GLX-XXX-GLX-LEU-VAL-LEU-HIS-VAL-
Known:  VAL-LEU-SER-GLU-GLY-GLU-TRP-GLN-LEU-VAL-LEU-HIS-VAL- 15                  20                 25
XXX-ALA-LYS-VAL-GLX-ALA-ASX-VAL-ALA-GLY-HIS-GLY-GLX-ASX-ILE-
TRP-ALA-LYS-VAL-GLU-ALA-ASP-VAL-ALA-GLY-HIS-GLY-GLN-ASP-ILE- 30                  35                 40
LEU-ILE-ARG-LEU-PHE-LYS-XXX-HIS-XXX-XXX-XXX-XXX-XXX-LYS-PHE-
LEU-ILE-ARG-LEU-PHE-LYS-SER-HIS-PRO-GLU-THR-LEU-GLU-LYS-PHE-

45
ASX-ARG
ASP-ARG
```

EXAMPLE 4

15 milligrams of sperm whale apomyoglobin were dissolved in 300 microliters of 98% formic acid and dried onto 120 milligrams of controlled pore glass. (Corning CPG 10–700 controlled pore glass from Corning Biomedical Products Department, Medfield, Mass.) Subsequent amino acid analysis showed that 1 milligram of the resulting preparation contained 5.72 nanomoles of protein. 2.6 milligrams (14.8 nanomoles)

```
              1             5                  10
Exp.:   PHE-VAL-ASX-GLX-HIS-LEU-AEC-GLY-XXX-HIS-LEU-VAL-GLX-
Known:  PHE-VAL-ASN-GLN-HIS-LEU-CYS-GLY-SER-HIS-LEU-VAL-GLU- 15                  20                 25
ALA-LEU-TYR-LEU-VAL-AEC-GLY-GLX-ARG-GLY-PHE-PHE-TYR-XXX-PRO-
ALA-LEU-TYR-LEU-VAL-CYS-GLY-GLU-ARG-GLY-PHE-PHE-TYR-THR-PRO- 30
LYS-ALA
LYS-ALA-end
```

EXAMPLE 3

Three milligrams of sperm whale apomyoglobin were dissolved in 30 microliters of 98% formic acid and dried onto 15 milligrams of cross-linked macroporous polystyrene beads. (The beads were XAD-2 resin from Rohm & Haas Co. ground to 60 to 120 mesh and washed in methanol and 1-chlorobutane and dried.) 14.8 milligrams of the resulting preparation (approximately 150 nanomoles) were loaded into a cartridge and sequenced by the operating procedure described above with the following modifications: Step 3 was 3 seconds in duration at a flowrate of 0.5 ml/min. Step 4a was 60 seconds in duration. An additional step, 4c, between steps 4b and 5, purged the cartridge with 100 ml/min nitrogen flow for 120 seconds duration. Step 6b was 360 seconds in duration. Step 7 was 720 seconds in duration. Step 9 was 25 seconds in duration and employed 1-chlorobutane in place of ethyl acetate as the extraction solvent. Step 10b was 350 seconds in duration. Valve 128 was actuated to apply vacuum to the cartridge on steps 4c, 6b, 8 and 10. Step 6a was eliminated altogether so that the ATZ derivatives of amino acids were not converted to PTH-amino acids. The ATZ-amino acids were hydrolyzed with 6N HCl at 110° C for 20 hours to recover free amino acids, and the amino acids were analyzed by high voltage paper electrophoresis to obtain the following sequence listed as "Exp.". The of the preparation were loaded into a cartridge for sequencing. Because this amount of material did not fill the cartridge, the remaining space in the cartridge was filled with two cylindrical glass rods which just filled the cartridge bore with enough clearance to allow free flow of gases and liquids. The material in the cartridge was sequenced by the operating procedure described above with the following modifications: Reservoir 64 was filled with radioactively labelled coupling reagent, 0.33% by volume 35-S-PITC in heptane. Step 1 was 1 second in duration at a flowrate of 0.150 ml/min, delivering the radioactive coupling reagent to the cartridge. Step 2 was replaced with steps 2a and 2b, which were identical to steps 4a and 4b, respectively, except that step 2b was only 298 seconds in duration. Step 3 was only 1 second in duration. Step 4a was 2 seconds in duration, and valve 128 was actuated to apply vacuum to the cartridge during this step. Step 4b was 598 seconds in duration. Step 6b was 80 seconds in length. Step 9 was 85 seconds in duration at a flowrate of 0.30 ml/min. Step 10a was 90 seconds in duration, and step 10b was eliminated. The PTH-amino acids were analyzed by thin-layer chromatography and the radioactive derivatives were located by autoradiography to obtain the following sequence listed as "Exp.". The known sequence of sperm whale apomyoglobin is also listed below for comparison.

```
              1             5                  10
Exp:    VAL-LEU-XXX-GLU-GLY-GLU-TRP-GLN-LEU-VAL-LEU-HIS-VAL-
Known:  VAL-LEU-SER-GLU-GLY-GLU-TRP-GLN-LEU-VAL-LEU-HIS-VAL-
```

```
              15                  20                  25
TRP-ALA-LYS-VAL-GLU-ALA-ASP-VAL-ALA-GLY-HIS-GLY-GLN-ASP-ILE-
TRP-ALA-LYS-VAL-GLU-ALA-ASP-VAL-ALA-GLY-HIS-GLY-GLN-ASP-ILE- 30                  35                  40
LEU-ILE-ARG-LEU-PHE-LYS-XXX-HIS-PRO-GLU-XXX-LEU-GLU-LYS-PHE-
LEU-ILE-ARG-LEU-PHE-LYS-SER-HIS-PRO-GLU-THR-LEU-GLU-LYS-PHE-

45
HIS-ARG
HIS-ARG
```

What is claimed is:

1. In a method for the sequential degradation of protein or peptide chains in a reaction chamber by successive coupling and cleavage reactions, the steps of:
   a. immobilizing said protein or peptide on a macroporous reaction support surface disposed in the reaction chamber, said immobilization being performed either by nonchemical sorptive deposition onto said support surface or by chemical linkage to said support surface,
   b. passing coupling reagent through the reaction chamber to contact said immobilized protein or peptide,
   c. directing a pressurized vapor stream comprising coupling base vapor through the reaction chamber while said coupling reagent is in contact with said protein or peptide to provide basic environment for coupling of said coupling reagent to said chains,
   d. flowing a liquid washing solvent through the reaction chamber to remove unreacted coupling reagent and other contaminants from the support surface,
   e. directing a pressurized stream of inert carrier gas through the reaction chamber after step (d) to at least partially dry said support surface,
   f. directing a pressurized vapor stream comprising cleavage reagent vapor through the reaction chamber for sufficient time to cleave amino acid derivatives from said coupled protein or peptide, and
   g. flowing a liquid extracting solvent through the reaction chamber after step (f) to extract and withdraw said cleaved amino acid derivative.

2. The method of claim 1 in which the washing solvent is delivered to the reaction chamber under pressure from a source of pressurized gas.

3. The method of claim 1 in which the extracting solvent is delivered to the reaction chamber under pressure from a source of pressurized gas.

4. In a method for the sequential degradation of protein or peptide chains in a reaction chamber by successive coupling and cleavage reactions, the steps of:
   a. immobilizing the protein or peptide on a macroporous reaction support surface disposed in the reaction chamber, said immobilization being performed either by nonchemical sorptive deposition onto said support surface or by chemical linkage to said support surface,
   b. passing coupling reagent in liquid form through the reaction chamber to contact and deposit on said immobilized protein or peptide chains, and
   c. directing a pressurized vapor stream comprising coupling base vapor through the reaction chamber while said protein or peptide chains are wet with coupling reagent liquid to provide a basic environment for coupling of said coupling reagent to said immobilized protein or peptide.

5. The method of claim 3 in which said pressurized vapor stream comprises coupling base vapor entrained in an inert carrier gas.

6. The method of claim 5 in which said coupling base is entrained in said carrier gas stream by bubbling said gas stream through a reservoir of said coupling base in liquid form.

7. The method of claim 6 in which said coupling reagent is urged through said reaction chamber in a liquid stream under pressure from a source of gas pressure.

8. The method of claim 3 in which said immobilization of step (a) is performed by nonchemical sorptive deposition of said chains.

9. The method of claim 3 in which said immobilization of step (a) is performed by chemical linkage of said chains to said reaction support surface.

10. The method of claim 3 together with the following step after step (c):
    d. passing a pressurized vapor stream comprising cleavage reagent vapor through the reaction chamber for sufficient time to cleave amino acid derivatives from said coupled protein or peptide chains.

11. The method of claim 9 together with the following steps performed between steps (c) and (d):
    e. flowing a liquid washing solvent through the reaction chamber to remove unreacted coupling reagent and other contaminants from said surface,
    f. directing a pressurized stream of inert carrier gas through the reaction chamber after step (e) for sufficient time to at least partially dry said reaction support surface.

12. The method of claim 3 in which said support surface is formed of a material selected from the group consisting of macroreticular cross-linked polystyrene and its derivatives and macroporous glass and its derivatives.

13. The method of claim 3 in which said reaction chamber is detachably disposed in an apparatus during performance of steps (b) and (c), and said peptides or proteins are immobilized on said reaction support surface in said reaction chamber prior to disposition of the same in said apparatus.

14. In a method for the sequential degradation of protein or peptide chains in a reaction chamber by successive coupling and cleavage reactions, the steps of:
    a. immobilizing said peptide or protein chains on a macroporous reaction support surface disposed in the reaction chamber, said immobilization being performed either by nonchemical sorptive deposition onto said support surface or by chemical linkage to said support surface,
    b. chemically coupling a coupling reagent to said protein or peptide chains,
    c. passing a pressurized vapor stream comprising cleavage reagent vapor through the reaction chamber for sufficient time to cleave amino acid derivatives from said coupled protein or peptide chains, and d. flowing a liquid extracting solvent through the reaction chamber to extract and withdraw said cleaved amino acid derivatives.

15. The method of claim 14 in which said pressurized vapor stream comprises cleavage reagent vapor entrained in an inert carrier gas.

16. The method of claim 13 in which said cleavage reagent is entrained in said carrier gas stream by bubbling said gas stream through a reservoir of said cleavage reagent in liquid form.

17. The method of claim 12 in which said immobilization of step (a) is performed by nonchemical sorptive deposition of said protein or peptide chains onto said support surface.

18. The method of claim 12 in which said immobilization of step (a) is performed by chemical linkage of said protein or peptide chains to said support surface.

19. The method of claim 12 in which the cleavage reagent is an anhydrous acid.

20. The method of claim 18 in which said extracting solvent is delivered to said reaction chamber under pressure from a source of pressurized inert gas.

21. The method of claim 12 together with the following steps performed between steps (b) and (c):

e. flowing a liquid washing solvent through the reaction chamber to remove unreacted coupling reagent and other contaminants from said support surface, and f. directing a pressurized stream of inert carrier gas through the reaction chamber to at least partially dry said support surface.

22. The method of claim 21 in which said extracting solvent is delivered to said reaction chamber under pressure from a source of pressurized gas.

23. The method of claim 12 in which said support surface is formed of a material selected from the group consisting of macroreticular cross-linked polystyrene and its derivatives and macroporous glass and its derivatives.

24. The method of claim 12 in which said reaction surface comprises the surface of a bed of particles disposed in the path of said pressurized vapor stream flowing through the reaction chamber.

25. The method of claim 12 in which said reaction chamber is detachably disposed in an apparatus during performance of steps (b) and (c), and said protein or peptide chains are immobilized on said reaction support surface in said reaction chamber prior to disposition of the same in said apparatus.

26. In a method for the sequential degradation of protein or peptide chains in a reaction chamber by successive coupling and cleavage reactions, the steps of:

a. immobilizing said protein or peptide chains on a macroporous surface in said chamber by nonchemical sorptive deposition, b. chemically coupling a coupling reagent to said protein or peptide chains in the presence of a coupling base, and c. directing a cleavage reagent through the reaction chamber for sufficient time to cleave amino acid derivative from said coupled protein or peptide chains, and d. flowing a liquid extracting solvent through the reaction chamber to extract and withdraw said cleaved amino acid derivative.

27. The method of claim 26 in which coupling base is directed through said reaction chamber in vapor form while the protein or peptide chains are wet with coupling reagent liquid.

28. The method of claim 23 in which step (c) is performed by passing through the reaction chamber a pressurized vapor stream comprising cleavage reagent vapor.

29. The method of claim 26 in which said pressurized vapor stream comprises said cleavage reagent vapor entrained in an inert carrier gas.

* * * * *